(12) United States Patent
Gombert et al.

(10) Patent No.: US 9,493,024 B2
(45) Date of Patent: Nov. 15, 2016

(54) SYSTEM AND METHOD TO DERIVE STRUCTURE FROM IMAGE

(75) Inventors: Barry Glynn Gombert, Rochester, NY (US); Philip Crane Rose, Sodus, NY (US); Robert Roy Buckley, Rochester, NY (US); John O. Walker, Rochester, NY (US); Jennifer C. Perrotti, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 2364 days.

(21) Appl. No.: 12/336,159

(22) Filed: Dec. 16, 2008

(65) Prior Publication Data

US 2010/0149597 A1   Jun. 17, 2010

(51) Int. Cl.
*G06K 15/00* (2006.01)
*B42D 15/00* (2006.01)

(52) U.S. Cl.
CPC ..... *B42D 15/008* (2013.01); *G06K 2215/0082* (2013.01)

(58) Field of Classification Search
USPC ...... 358/1.1, 1.18; 700/95; 493/325; 706/55; 707/804; 53/410, 412; 382/282
See application file for complete search history.

(56) References Cited

U.S. PATENT DOCUMENTS

| | | |
|---|---|---|
| 3,902,655 A | 9/1975 | Huffman |
| 5,235,519 A | 8/1993 | Miura |
| 5,291,583 A | 3/1994 | Bapat |
| 5,457,904 A | 10/1995 | Colvin |
| 5,513,117 A | 4/1996 | Small |
| 5,518,574 A | 5/1996 | Yates et al. |
| 5,528,517 A | 6/1996 | Loken |
| 5,687,087 A | 11/1997 | Taggart |
| 5,768,142 A | 6/1998 | Jacobs |

(Continued)

FOREIGN PATENT DOCUMENTS

| | | |
|---|---|---|
| WO | 2005000681 A2 | 1/2005 |
| WO | 2005054983 A2 | 6/2005 |

(Continued)

OTHER PUBLICATIONS

Liang Lu et al., "Folding Cartons with Fixtures: A Motion Planning Approach", IEEE Transactions on Robotics and Automation, vol. 16, No. 4, Aug. 2000.

*Primary Examiner* — Marivelisse Santiago Cordero
*Assistant Examiner* — Neil R McLean
(74) *Attorney, Agent, or Firm* — Fox Rothschild LLP

(57) ABSTRACT

A method and system creates a printed substrate suitable for conversion into a three-dimensional object. A template generator identifies a printing template having die line data representing a cutting path and folding position data representing a folding path. Foreground image data representative of a first image is automatically applied the selected printing template to define a target location for the first image, and also to define a second die line around a portion of the target location to form a second cutting path based on the foreground image data. A printer prints the first image onto a substrate at the target location, a cutting device cuts the substrate along the first cutting path and the second cutting path, and a scoring device scores the substrate along the folding path to generate a printed substrate that will fold into a three-dimensional object.

20 Claims, 3 Drawing Sheets

(56) References Cited

U.S. PATENT DOCUMENTS

| | | |
|---|---|---|
| 5,805,784 A | 9/1998 | Crawford |
| 5,838,574 A | 11/1998 | Olson et al. |
| 5,881,538 A | 3/1999 | Blohm |
| 5,923,556 A | 7/1999 | Harris |
| 6,005,959 A | 12/1999 | Mohan et al. |
| 6,090,027 A | 7/2000 | Brinkman |
| 6,092,054 A | 7/2000 | Tackbary et al. |
| 6,117,061 A * | 9/2000 | Popat et al. .................. 493/325 |
| 6,134,018 A | 10/2000 | Dziesietnik et al. |
| 6,153,039 A | 11/2000 | Jacobsen |
| 6,237,787 B1 | 5/2001 | Gallo et al. |
| 6,243,172 B1 | 6/2001 | Gauthier et al. |
| 6,246,468 B1 | 6/2001 | Dimsdale |
| 6,332,149 B1 | 12/2001 | Warmus et al. |
| 6,409,019 B1 | 6/2002 | Hornsby et al. |
| 6,687,016 B2 | 2/2004 | Gauthier |
| 6,689,035 B1 * | 2/2004 | Gerber .......................... 493/320 |
| 6,771,387 B2 | 8/2004 | Gauthier |
| 6,895,549 B1 | 5/2005 | Albright et al. |
| 6,896,250 B2 | 5/2005 | Hillebrand |
| 6,939,063 B2 | 9/2005 | Bussell |
| 6,945,645 B2 * | 9/2005 | Baron .......................... 347/104 |
| 6,948,115 B2 | 9/2005 | Aizikowitz et al. |
| 6,953,513 B1 | 10/2005 | Volkert |
| 7,013,616 B1 | 3/2006 | Powers et al. |
| 7,164,490 B2 * | 1/2007 | Manico et al. .............. 358/1.18 |
| 7,191,392 B1 | 3/2007 | Coar |
| 7,197,465 B1 | 3/2007 | Hu et al. |
| 7,243,303 B2 | 7/2007 | Purvis et al. |
| 7,293,652 B2 | 11/2007 | Learn et al. |
| 7,327,362 B2 | 2/2008 | Grau |
| 7,346,408 B2 * | 3/2008 | Van Bael et al. ................ 700/98 |
| 7,366,643 B2 | 4/2008 | Verdura et al. |
| 7,406,194 B2 | 7/2008 | Aizikowitz et al. |
| 7,647,752 B2 | 1/2010 | Magnell |
| 7,832,560 B2 | 11/2010 | Tilton |
| 2002/0085001 A1 | 7/2002 | Taylor |
| 2002/0118874 A1 | 8/2002 | Chung et al. |
| 2003/0012454 A1 * | 1/2003 | Manico et al. ................ 382/282 |
| 2003/0035138 A1 | 2/2003 | Schilling |
| 2003/0083763 A1 | 5/2003 | Kiyohara et al. |
| 2003/0091227 A1 | 5/2003 | Chang et al. |
| 2003/0164875 A1 | 9/2003 | Meyers |
| 2003/0200111 A1 | 10/2003 | Damji |
| 2004/0073407 A1 | 4/2004 | Nguyen et al. |
| 2004/0120603 A1 | 6/2004 | Gupta |
| 2004/0218799 A1 | 11/2004 | Mastie et al. |
| 2005/0005261 A1 | 1/2005 | Severin |
| 2005/0050052 A1 | 3/2005 | Zimmerman et al. |
| 2005/0249400 A1 | 11/2005 | Fukumoto |
| 2005/0278614 A1 | 12/2005 | Aizikowitz et al. |
| 2005/0278621 A1 | 12/2005 | Aizikowitz et al. |
| 2006/0080274 A1 | 4/2006 | Mourad |
| 2006/0155561 A1 | 7/2006 | Harper |
| 2006/0217831 A1 | 9/2006 | Butterworth et al. |
| 2006/0284360 A1 | 12/2006 | Hume et al. |
| 2007/0042885 A1 | 2/2007 | Rietjens et al. |
| 2007/0112460 A1 | 5/2007 | Kiselik |
| 2007/0172986 A1 | 7/2007 | Huang et al. |
| 2008/0048308 A1 | 2/2008 | Lam |
| 2008/0255945 A1 | 10/2008 | Percival et al. |
| 2009/0063381 A1 | 3/2009 | Chan et al. |
| 2009/0070213 A1 | 3/2009 | Miller et al. |
| 2009/0236752 A1 | 9/2009 | Lee et al. |
| 2009/0282782 A1 | 11/2009 | Walker et al. |
| 2009/0287632 A1 | 11/2009 | Gombert et al. |
| 2009/0287717 A1 | 11/2009 | Gombert et al. |
| 2010/0060909 A1 | 3/2010 | Conescu et al. |
| 2010/0098319 A1 | 4/2010 | Gombert et al. |
| 2010/0110479 A1 | 5/2010 | Gombert et al. |

FOREIGN PATENT DOCUMENTS

| | | |
|---|---|---|
| WO | 2005122079 A2 | 12/2005 |
| WO | WO 2007021920 A2 | 2/2007 |

* cited by examiner

SYSTEM AND METHOD TO DERIVE STRUCTURE FROM IMAGE

BACKGROUND

The disclosed embodiments relate generally to methods and systems for creating printed objects having three-dimensional structure.

Printing systems are no longer limited to devices that print text and images on two-dimensional substrates. Today, structural printing systems must be able to print text and images on a substrate, and also perform structural functions such as cutting, perforating or, and scoring for folds so that the resulting substrate can be manipulated into a three-dimensional structure. Greeting cards, pop-up books, and packages are examples of printed substrates that can move from a flat structure to a three dimensional structure through manipulation of folds, creases, cuts and perforations.

Current structural printing systems implement a set of instructions and can mass-produce similar items, but the systems have limited ability to customize print jobs with structural features. These limitations can cause delays in assembly time as the system is reprogrammed or manually manipulated to change images and/or substrates.

This document describes systems that solve one or more of the problems listed above.

SUMMARY

In an embodiment, a method of creating a printed substrate suitable for conversion into a three-dimensional object includes identifying a printing template. The template includes first die line data representing a first cutting path and folding position data representing a folding path. The embodiment also includes receiving foreground image data representative of a first image, automatically applying the first image data to the selected printing template to define a target location for the first image, defining a second die line around a portion of the target location to form a second cutting path based on the first image data, using a printing device to print the first image on the substrate at the target location, cutting the substrate along the first cutting path and the second cutting path, and scoring the substrate along the folding path to generate a printed substrate that will fold into a three-dimensional object. Any or all of the steps may be implemented via a computer program instructions on a computer-readable medium that instruct a processing device to perform the steps.

Optionally, the defining may include defining the second die line to form the second cutting path so that when the substrate is folded into the three-dimensional object, a foreground image corresponding to the first image will be presented in front of and set off from a background portion of the substrate. Also, the target location may be positioned to place the image along the folding path, and if so the defining may include defining the second die line to form the second cutting path to correspond to a boundary of the first image that is present on a first side of the folding path and not to any boundary of the first image that is present on the opposite side of the cutting path and the scoring will them not apply a crease to the first image along the folding path. The method also may include selecting a background image and printing the background image onto the background portion of the substrate.

Alternatively, defining the second die line may include automatically detecting an edge of the first image by image processing, and setting the die line to correspond to a portion of the detected edge.

Optionally, the target location may be positioned to place the image along the folding path; the defining may include receiving a user input that selects the second die line, and the scoring does not apply a crease to the image along the folding path.

Optionally, the method may include, before the printing presenting, via a visual display, a preview of the identified printing template and foreground image data to be printed. It also may include receiving an adjusted target location, presenting via the visual display a revised preview based on the adjusted target location wherein the foreground image data has been moved to the adjusted target location, and receiving a user acceptance of the adjusted target location. Defining of the second die line may then be based on the adjusted target location.

Optionally, after identifying the printing template, the method also may include displaying the printing template to a user, and displaying a candidate image to the user. If so, receiving the foreground image data may include receiving a selection of the candidate image from the user via dragging and dropping the candidate image onto the template.

Optionally, the method may include selecting a background image and printing the background image onto the substrate so the background image so that the background image does not overlap the first image.

In an alternate embodiment, a system for creating a printed substrate suitable for conversion into a three-dimensional object includes a template generator containing program instructions to identify a printing template having first die line data representing a first cutting path and folding position data representing a folding path. The instructions also are to receive foreground image data representative of a first image, automatically apply the foreground image data to the selected printing template to define a target location for the first image, and define a second die line around a portion of the target location to form a second cutting path based on the foreground image data. The system also includes a printer configured to print the first image onto a substrate at the target location; a cutting device configured to cut the substrate along the first cutting path and the second cutting path, and a scoring device configured to score the substrate along the folding path to generate a printed substrate that will fold into a three-dimensional object.

Optionally, the system also includes a display device configured to display a preview of the identified printing template and foreground image data to be printed, and a user input configured to receive an adjusted target location. The display is also configured to display a revised preview based on the adjusted target location wherein the foreground image data has been moved to the adjusted target location.

Optionally, the system also includes a display device configured to display a preview of the identified printing template and foreground image data to be printed, and a user input configured to receive a candidate image selection. The display device is also configured to display a revised preview based on the candidate image selection.

DETAILED DESCRIPTION

Before the present embodiments are described, it is to be understood that this invention is not limited to the particular systems, methodologies or protocols described, as these may vary. Also, the terminology used herein is for the purpose of describing particular embodiments and is not intended to limit the scope of the present disclosure, which will be limited only by the appended claims.

As used in this description and in the appended claims, the singular forms "a," "an," and "the" include the plural reference unless the context clearly dictates otherwise. Unless defined otherwise, all technical and scientific terms used herein have the same meanings as commonly understood by one of ordinary skill in the art. As used herein, the term "comprising" means "including, but not limited to."

As used in this document, a "computing device" is a device including a processor and memory for executing computer-readable instructions and processing data. An "image" is a set of graphics, text, numbers, designs, colors, or other indicia that may be printed onto a substrate. A "printing device" is an electronic device that is capable of receiving commands and printing text and/or images on a substrate. Printing devices may include, but are not limited to, network printers, production printers, copiers and other devices that apply text and images to a substrate using ink or toner. Printing devices may also perform a combination of functions such as printing and scanning, in which case such devices may be considered to be multifunctional devices. Printing devices may create two-dimensional documents or three-dimensional items such as packages.

Figure 1:
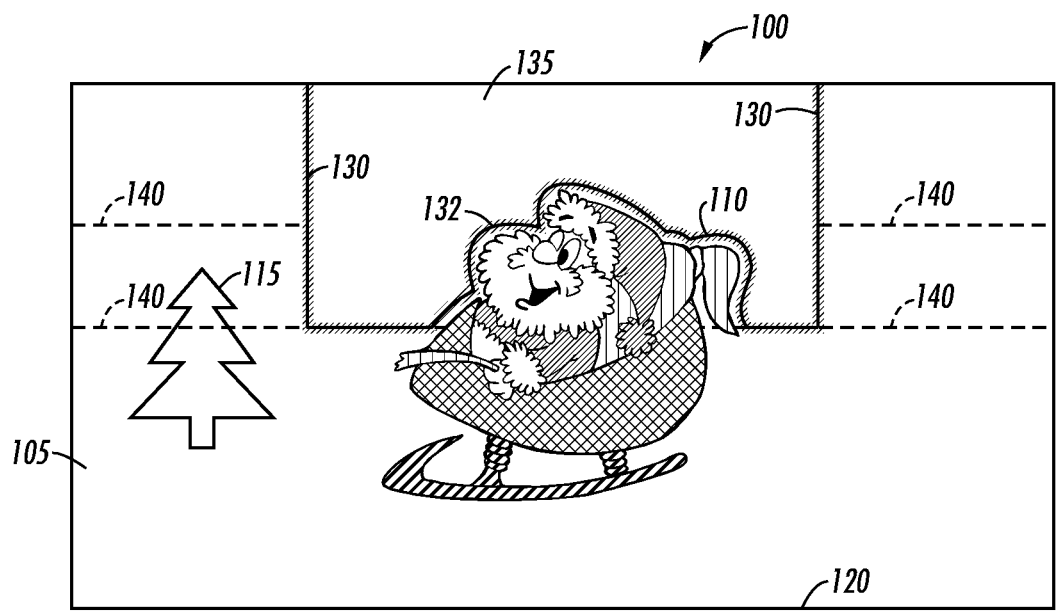
FIG. 1 illustrates an exemplary printed flat substrate that can be cut and folded to exhibit three-dimensional features.
Figure 2:
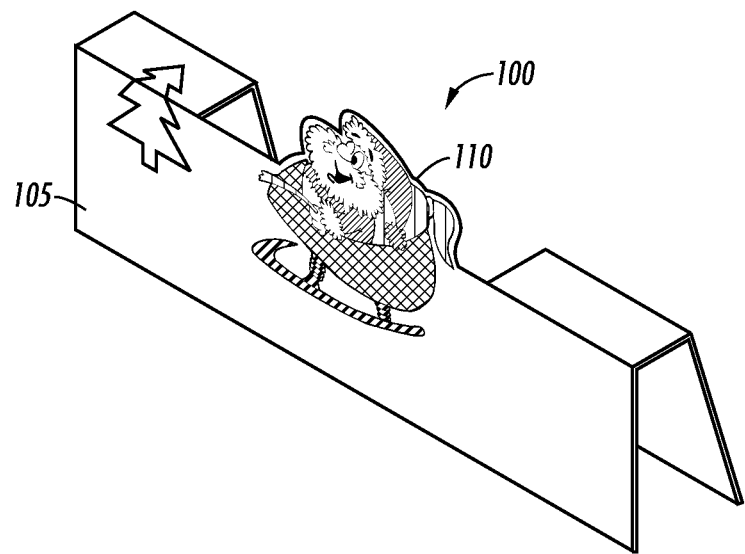
FIG. 2 illustrates the substrate of FIG. 1 after is has been printed and folded.

Referring to FIG. 1, a three-dimensional printed object 100 includes various images printed on a substrate 105, such as cardstock, paper, cardboard, or other printable material. FIG. 1 shows a card 100 in the form of a printed flat, and the card 100 may form a three-dimensional object when folded across various fold lines. The card 100 includes a foreground image 110 and optionally one or more background images 115. The border of the object is defined by an exterior cutting path 120 (shown as a solid line in FIG. 1). The card also includes one or more interior cutting paths 130 (shown as dashed lines with cross-hatching) that allow a rear portion 135 of the card to be moved away from the foreground image, creating a three-dimensional feature. The card also may include creases 140 that serve as guides for filing the card to create additional three-dimensional features. In this manner, when cut and folded, the card 100 may exhibit three-dimensional features as shown in FIG. 2.

Figure 3:
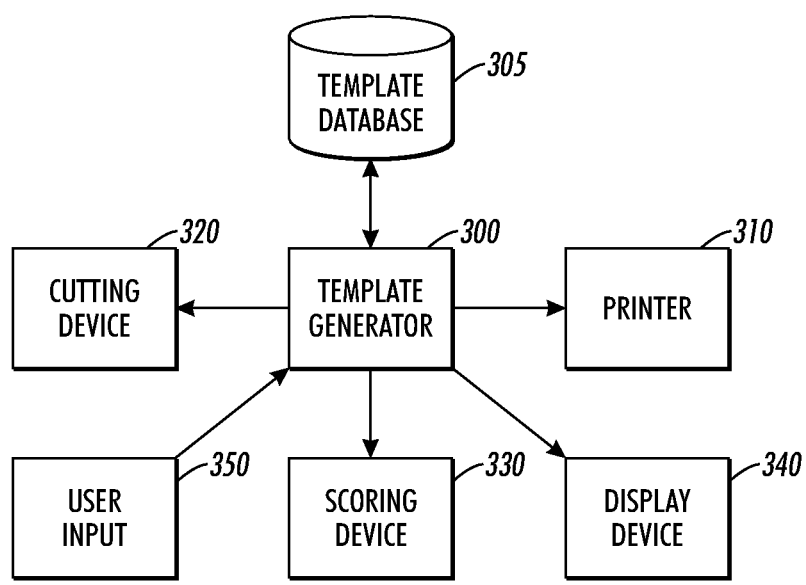
FIG. 3 depicts exemplary elements of a system for creating a three-dimensional, printed substrate.

Referring to FIG. 3, the card or another three-dimensional object may be created using a printing template generator 300, a printing device 310, a cutting device 320 and a scoring device 330. The template generator 300 may be a computing device or any other device containing a processor and computer-readable memory that receives and implements program instructions to generate a printing template. The template may be obtained from a template database 305, or it may be generated anew based on user or data input. The template includes die line data that representing the positions and sizes of one or more cutting paths for a substrate (see lines 130 in FIG. 1). The template also includes folding position data one or more positions on the substrate along which a crease, line or other indicator should be applied to create a folding path (see lines 140 in FIG. 1). The template receives foreground image data representative of a foreground image (110 in FIG. 1), automatically applies the foreground image data to the printing template to define a target location for the first image. The template generator 300 also defines a second die line (132 in FIG. 1) around a portion of the target location to form a second cutting path.

The system includes a printing device 310. The printer 310 receives information from the template generator and prints the first image onto a substrate at the target location, along with any other content and/or background images. The system also includes a cutting device 320 that receives the die line data from the template generator 300 and cuts the substrate along the defined cutting paths. The system also includes a scoring device 300 that applies creases, folds, lines, or other indicators along the folding paths based on folding line data received from the template generator.

The system also may include a display device 340 that displays a preview of the selected printing template and foreground image data to be printed. The system also may include a user input 350, such as a keyboard, data input, touch screen, communications port, or other input mechanism that receives information such as selections of displayed items and/or uploaded image data.

Figure 4:
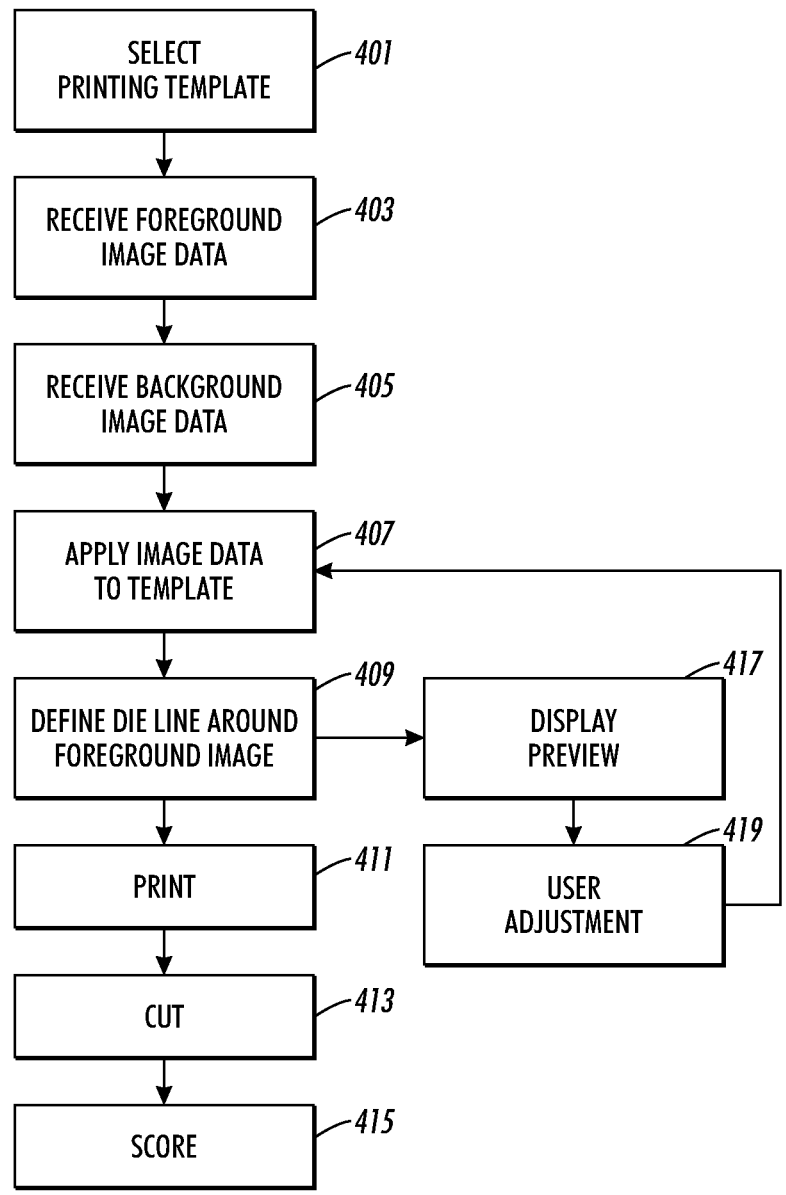
FIG. 4 is a flowchart showing steps that may be following in a method of creating a three-dimensional printed substrate.

FIG. 4 is a flowchart illustrating exemplary steps in a method of generating a three-dimensional document. Referring to FIG. 4, the method may include selecting a printing template (step 401). The printing template is a data file that defines certain features of a printed substrate, such as boundary definitions, size, shape, and other features. The printing template includes data identifying the location of one or more die lines, and each die line can be used by a cutting device to cut boundary lines, and other cuts into the document along cutting paths (see lines 120 and 130 in FIG. 1). The printing template also includes data identifying the location of one or more folding paths, and each folding path can be used by a scoring device to embed one or more creases, folds, lines marking where a human should fold a document, or other indicia along folding paths (see line 140 in FIG. 1). The printing template may be selected by a user from a menu of available templates, it may be automatically selected from a template database by a computing device based on one or more variables, or it may be uploaded by a user or received from an external source.

The method may then receive foreground image data (step 403) representative of a first image (see image 110 in FIG. 1) to be printed on the substrate. The foreground image may be an image uploaded by a user, or selected by a user from a menu of available images, or it may be automatically uploaded into the template based on variables or criteria available to the processor. The foreground image data is automatically applied to the selected printing template to define a target location for the first image (step 407). Optionally, the system also may receive background image data (step 405), whether by user selection, user upload, selection based on criteria, or simply because the background image data is part of the printing template. The background image data is also made part of the printing template. The method also includes defining a die line around a portion of the foreground image at the target location to form a cutting path (line 132 in FIG. 1) based on the foreground image data (step 409).

A printing device then uses the printing template to print (step 411) onto a substrate (step 411) the first image at the target location, and optionally the background image and any other content that is to be printed onto the substrate. A cutting device cuts the substrate along each cutting path (step 413), and a scoring device establishes creases, folds or folding lines along each folding path (step 415). The resulting printed, cut, and scored substrate can then be folded into a three-dimensional object.

When folded into a three-dimensional object, the foreground image will be presented in front of and set off from a background portion of the substrate, as shown in FIG. 2.

If the target location is positioned to place the image along a folding path, as shown in FIG. 1 the die lines may be defined so that the cutting path 132 around the foreground image corresponds to a boundary of the image that is present above, i.e., on a first side, of the folding path and not to any boundary of the image that is present on the opposite side of the cutting. Similarly, in this situation the scoring may not apply a crease along the foreground image. Alternatively, the die lines may be defined so that the foreground image is not positioned along a fold, but rather is positioned to fold out from or lift up from the background. The cutting path around the foreground image may be identified based on predetermined criteria, based on image processing techniques such as edge detection, or other criteria. Thus, the image serves to pop up from the substrate when it is folded into a three dimensional object.

Referring again to FIG. 4, optionally before the printing, the method may include presenting (step 417), via a visual display, a preview of the selected printing template and foreground image data to be printed. A user may then adjust (step 419) various features of the printing template, such as the target location or an alternate foreground image. The user may be permitted to drag and drop additional foreground images or other content onto the template. The adjusted template may again be displayed (step 417) until the user accepts the printing template. The adjusted template may include a revised preview based on the adjusted target location so that the foreground image data has been moved to the adjusted target location, or a new image is presented along with a new cutting path around the foreground image. The foreground image may be displayed so that it is never overwritten by a portion of the background image, i.e., the background image does not overlap the foreground image.

In some embodiments, computer-readable code may contain instructions that instruct a processor to cause any or all of the steps described above to be performed. The processor may be in communication with the printing device, cutting device, and/or scoring device, or the software may be installed on a computer-readable medium such as in a memory, or as firmware in any of the devices.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of creating a printed substrate suitable for conversion into a three-dimensional object, comprising:
    generating, by a template generator, a printing template, the template comprising first die line data representing a first cutting path and folding position data representing a folding path;
    receiving foreground image data representative of a first image;
    automatically applying the first image data to the selected printing template to define a target location for the first image;
    by the template generator, defining a second die line around a portion of the target location to form a second cutting path based on the first image data;
    receiving from the template generator, by a system comprising a printing device, a cutting device and a scoring device, information comprising the target location, the first die line data, the folding position data, and data defining the second die line;
    printing onto a substrate, by the printing device, the first image at the target location; and
    cutting, by the cutting device, the substrate along the first cutting path and the second cutting path; and
    scoring, by the scoring device, the substrate along the folding path to generate a printed substrate that will fold into a three-dimensional object.

2. The method of claim 1, wherein the defining comprises defining the second die line to form the second cutting path so that when the substrate is folded into the three-dimensional object, a foreground image corresponding to the first image will be presented in front of and set off from a background portion of the substrate.

3. The method of claim 1, wherein:
    the target location is positioned to place the image along the folding path;
    the defining comprises defining the second die line to form the second cutting path to correspond to a boundary of the first image that is present on a first side of the folding path and not to any boundary of the first image that is present on the opposite side of the cutting path; and
    the scoring does not apply a crease to the first image along the folding path.

4. The method of claim 1, wherein:
    the target location is positioned to place the image along the folding path;
    the defining comprises receiving a user input that selects the second die line; and
    the scoring does not apply a crease to the image along the folding path.

5. The method of claim 1, further comprising, before the printing:
    presenting, via a visual display, a preview of the identified printing template and foreground image data to be printed;
    receiving an adjusted target location;
    presenting, via the visual display, a revised preview based on the adjusted target location wherein the foreground image data has been moved to the adjusted target location; and
    receiving a user acceptance of the adjusted target location;
    wherein the defining of the second die line is based on the adjusted target location.

6. The method of claim 1, wherein, after identifying the printing template, the method also comprises:
    displaying the printing template to a user; and
    displaying a candidate image to the user;
    wherein the receiving of the foreground image data comprises receiving a selection of the candidate image from the user via dragging and dropping the candidate image onto the template.

7. The method of claim 1, further comprising:
    selecting a background image; and printing the background image onto the substrate so the background image so that the background image does not overlap the first image.

8. The method of claim 2, further comprising:
selecting a background image; and
printing the background image onto the background portion of the substrate.

9. The method of claim 1, wherein defining the second die line comprises automatically detecting an edge of the first image by image processing, and setting the die line to correspond to a portion of the detected edge.

10. A system for creating a printed substrate suitable for conversion into a three-dimensional object, comprising:
a template generator containing program instructions to:
identify a printing template, the template comprising first die line data representing a first cutting path, and folding position data representing a folding path;
receive foreground image data representative of a first image;
automatically apply the foreground image data to the selected printing template to define a target location for the first image; and
define a second die line around a portion of the target location to form a second cutting path based on the foreground image data;
a printer configured to print the first image onto a substrate at the target location;
a cutting device configured to cut the substrate along the first cutting path and the second cutting path; and
a scoring device configured to score the substrate along the folding path to generate a printed substrate that will fold into a three-dimensional object.

11. The system of claim 10, further comprising:
a display device configured to display a preview of the identified printing template and foreground image data to be printed; and
a user input configured to receive an adjusted target location;
wherein the display is also configured to display a revised preview based on the adjusted target location wherein the foreground image data has been moved to the adjusted target location.

12. The system of claim 10, further comprising:
a display device configured to display a preview of the identified printing template and foreground image data to be printed; and
a user input configured to receive a candidate image selection;
wherein the display device is also configured to display a revised preview based on the candidate image selection.

13. A non-transitory computer readable medium containing computer program instructions that cause a processor to:
identify a printing template, the template comprising first die line data representing a first cutting path and folding position data representing a folding path;
receive foreground image data representative of a first image;
automatically apply the first image data to the selected printing template to define a target location for the first image;
define a second die line around a portion of the target location to form a second cutting path based on the first image data;
print onto a substrate, by a printing device, the first image at the target location;
cut the substrate along the first cutting path and the second cutting path; and
score the substrate along the folding path to generate a printed substrate that will fold into a three-dimensional object.

14. The non-transitory computer-readable medium of claim 13, wherein the instructions that cause the processor to define the second die line further comprise instructions to form the second cutting path so that when the substrate is folded into the three-dimensional object, a foreground image corresponding to the first image will be presented in front of and set off from a background portion of the substrate.

15. The non-transitory computer-readable medium of claim 13, wherein:
the instructions that cause the processor to define the second die line comprise defining the second die line to form the second cutting path to correspond to a boundary of the first image that is present on a first side of the folding path and not to any boundary of the first image that is present on the opposite side of the cutting path; and
the instructions that cause the processor to score the substrate ensure that the processor does not apply a crease to the first image along the folding path.

16. The non-transitory computer-readable medium of claim 13, wherein the instructions also cause the processor to, before the printing:
present, via a visual display, a preview of the identified printing template and foreground image data to be printed;
receive an adjusted target location;
present, via the visual display, a revised preview based on the adjusted target location wherein the foreground image data has been moved to the adjusted target location; and
receive a user acceptance of the adjusted target location;
wherein the defining of the second die line is based on the adjusted target location.

17. The non-transitory computer-readable medium of claim 13, wherein the instructions cause the processor, after identifying the printing template, to:
display the printing template to a user; and
display a candidate image to the user;
wherein the receiving of the foreground image data comprises receiving a selection of the candidate image from the user via dragging and dropping the candidate image onto the template.

18. The non-transitory computer-readable medium of claim 13, wherein the instructions also cause the processor to:
select a background image; and
print the background image onto the substrate so the background image so that the background image does not overlap the first image.

19. The non-transitory computer-readable medium of claim 14, wherein the instructions also cause the processor to:
select a background image; and
print the background image onto the background portion of the substrate.

20. The non-transitory computer-readable medium of claim 13, wherein the instructions that cause the processor to define the second die line further comprise instructions to:
automatically detect an edge of the first image by image processing, and set the die line to correspond to a portion of the detected edge.

* * * * *